United States Patent
Liu (10) Patent No.: US 9,845,827 B2
(45) Date of Patent: Dec. 19, 2017

(54) BEARING

(71) Applicant: Schaeffler Technologies AG & Co. KG, Herzogenaurach (DE)

(72) Inventor: Xin Liu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/310,318

(22) PCT Filed: Mar. 10, 2015

(86) PCT No.: PCT/CN2015/073920
§ 371 (c)(1),
(2) Date: Nov. 10, 2016

(87) PCT Pub. No.: WO2015/188640
PCT Pub. Date: Dec. 17, 2015

(65) Prior Publication Data
US 2017/0152890 A1  Jun. 1, 2017

(30) Foreign Application Priority Data

Jun. 11, 2014  (CN) .......................... 2014 1 0258106

(51) Int. Cl.
*F16C 33/78*  (2006.01)
*F16C 27/06*  (2006.01)
(Continued)

(52) U.S. Cl.
CPC .......... *F16C 27/066* (2013.01); *F16C 33/768* (2013.01); *F16C 33/80* (2013.01); *F16C 2208/10* (2013.01)

(58) Field of Classification Search
CPC ..................................... F16C 33/80
See application file for complete search history.

(56) References Cited

U.S. PATENT DOCUMENTS 2,637,574 A * 5/1953 Diehl ................... F16J 15/164
277/377
3,627,390 A * 12/1971 Irwin ................... F16J 15/164
277/433
(Continued)

FOREIGN PATENT DOCUMENTS

CN  102239341  11/2011
CN  202520783  11/2012
(Continued)

*Primary Examiner* — Thomas R. Hannon
(74) *Attorney, Agent, or Firm* — Volpe and Koenig, P.C.

(57) ABSTRACT

A bearing is provided, which includes a non-rotary inner ring; a rotary outer ring; and a sealing structure, located in a radial clearance between the inner ring and the outer ring, and includes a static seal ring and a dynamic seal ring which are coaxial and have one encircling the other one; wherein the static seal ring is fixedly configured on an outer circumferential surface of the inner ring, and includes a contact ring; the dynamic seal ring includes a ring-shaped body section and an elastic seal element; the body section includes a resist ring and a connect ring connected with the resist ring and located on a radial inner side of the resist ring; the connect ring is located on an axial inner side of the contact ring; the resist ring, the connect ring and the contact ring form an inner chamber; the elastic seal element is fixedly configured on the connect ring and comprises a seal lip protruding into the inner chamber; when a rotation speed of the outer ring is smaller than a critical value, the seal lip of the elastic seal element is in contact with the contact ring and a radial clearance exists between the seal lip and the resist ring; and when the rotation speed of the outer ring is greater than or equal to the critical value, the seal lip departs from the contact ring and stands against the resist ring, so that the seal lip and the static seal ring form a non-contact seal. Accordingly, the problem of existing bearing seals which (Continued)

cannot achieve advantages of both the contact seal and the non-contact seal at the same time is solved.

17 Claims, 2 Drawing Sheets

(51) Int. Cl.
  *F16C 33/76* (2006.01)
  *F16C 33/80* (2006.01)

(56) References Cited

U.S. PATENT DOCUMENTS

| | | |
|---|---|---|
| 4,699,526 A | 10/1987 | Sato |
| 6,623,165 B1 * | 9/2003 | Akagami .............. F16C 19/388 384/477 |
| 2013/0022305 A1 | 1/2013 | Kurohara |
| 2013/0127119 A1 | 5/2013 | Haepp et al. |
| 2015/0117805 A1 | 4/2015 | Takayama et al. |

FOREIGN PATENT DOCUMENTS

| | | |
|---|---|---|
| CN | 103052819 | 4/2013 |
| WO | 2013081075 | 6/2013 |

* cited by examiner

BEARING

The present application claims priority to Chinese patent application No. 201410258106.1, filed on Jun. 11, 2014, and entitled "BEARING", the entire disclosure of which is incorporated herein by reference.

FIELD OF THE INVENTION

The present disclosure generally relates to a bearing.

BACKGROUND

Existing bearing seals are classified into two categories, contact seals and non-contact seals. A general standard to evaluate the performance of a bearing seal includes the seal's ability to prevent external contaminants from entering into the bearing and to prevent lubricating agent in the bearing from leaking out.

The contact seals have reliable sealing performance, but are not suitable for bearings in high-speed rotation. The reason lies in that: when a bearing rotates at high-speed, a large friction torque is produced between a sealing structure and other parts of the bearing, which not only generates large amount of heat to accelerate aging of the sealing structure, but also cause severe wear to the sealing structure. As a result, service life of the sealing structure is reduced.

The non-contact seals are suitable for providing sealing for bearings in high-speed rotation, but do not have satisfactory sealing performance.

Existing bearing seals can realize either a contact seal or a non-contact seal. However, advantages of both the contact seal and the non-contact seal can not be achieved at the same time, which is exactly contrary to expectations of some bearings applied in situations with high demanding for sealing (e.g., a motor driven hub bearing).

SUMMARY

Problems solved by the present disclosure include: existing bearing seals can not achieve advantages of both the contact seal and the non-contact seal at the same time.

In order to solve above described problem, according to one aspect of the present disclosure, a bearing is provided. The bearing includes: a non-rotary inner ring, a rotary outer ring, and a sealing structure located in a radial clearance between the inner ring and the outer ring, wherein the sealing structure seals the bearing at an axial end portion of the bearing; the sealing structure includes a static seal ring and a dynamic seal ring which are coaxial and have one encircling the other one; the static seal ring is fixedly configured on an outer circumferential surface of the inner ring, and includes a contact ring extending along a radial direction of the bearing; the dynamic seal ring includes a ring-shaped body section and an elastic seal element; the body section includes a resist ring extending along an axial direction of the bearing and fixedly configured on an inner circumferential surface of the inner ring, and a connect ring connected with the resist ring and located on a radial inner side of the resist ring; the connect ring is located on an axial inner side of the contact ring; the resist ring, the connect ring and the contact ring form an inner chamber; the elastic seal element is fixedly configured on the connect ring and includes a seal lip protruding into the inner chamber; when a rotation speed of the outer ring is smaller than a critical value, the seal lip of the elastic seal element is in contact with the contact ring and a radial clearance exists between the seal lip and the resist ring; and when the rotation speed of the outer ring is greater than or equal to the critical value, the seal lip departs from the contact ring and stands against the resist ring under a centrifugal force, so that the seal lip and the static seal ring form a first non-contact seal.

In some embodiments, the elastic seal element includes a root section fixedly configured on the connect ring, and a reduced thickness waist section connecting the root section and the seal lip; a thickness of the reduced thickness waist section is smaller than a thickness of the seal lip; and the seal lip is capable of rotating with respect to the reduced thickness waist section.

In some embodiments, the connect ring includes a first suspended ring extending along the axial direction of the bearing, and a transition ring extending along the radial direction of the bearing and connecting the resist ring and the first suspended ring; the first suspended ring and the resist ring are configured to be spaced from and opposite to each other along the radial direction of the bearing; and the root section is fixed on the first suspended ring.

In some embodiments, the static seal ring further includes a retention ring and a second suspended ring; where the retention ring extends from a radial inner periphery of the contact ring along the axial direction of the bearing and is fixedly configured on an outer circumferential surface of the inner ring; the second suspended ring extends from a radial outer periphery of the contact ring along the axial direction of the bearing; an extending direction of the second suspended ring and that of the retention ring are opposite; the first suspended ring and the retention ring are configured to be spaced from and opposite to each other along the radial direction of the bearing, and form a second non-contact seal; and the resist ring and the second suspended ring are configured to be spaced from and opposite to each other along the radial direction of the bearing, and form a third non-contact seal.

In some embodiments, the root section of the elastic seal element is configured with a first labyrinth seal ring, and the first labyrinth seal ring is located in a radial clearance between the first suspended ring and the retention ring; and the sealing structure is configured with a second labyrinth seal ring, the second labyrinth seal ring is located in a radial clearance between the resist ring and the second suspended ring, and the second labyrinth seal ring is fixed on the second suspended ring.

In some embodiments, an end of the resist ring close to the connect ring has a tapered hole, and a diameter of the tapered hole gradually increases along a direction from an axial inner end of the resist ring to an axial outer end of the resist ring.

According to another aspect of the present disclosure, a bearing is provided. The bearing includes: a rotary inner ring, a non-rotary outer ring, and a sealing structure located in a radial clearance between the inner ring and the outer ring, wherein the sealing structure seals the bearing at an axial end portion of the bearing; the sealing structure includes a static seal ring and a dynamic seal ring which are coaxial and have one encircling the other one; the static seal ring is fixedly configured on an inner circumferential surface of the outer ring, and includes a contact ring extending along a radial direction of the bearing; the dynamic seal ring includes a ring-shaped body section and an elastic seal element; the body section includes a connect ring and a resist ring, the connect ring is fixedly configured on an outer circumferential surface of the inner ring, and the resist ring is connected with the connect ring and is located on a radial outer side of the connect ring; the resist ring extends along an axial direction of the bearing and a radial clearance exists between the resist ring and the inner ring; the resist ring is located on an axial outer side of the contact ring; the connect ring, the resist ring and the contact ring form an inner chamber; the elastic seal element is fixedly configured on the connect ring and includes a seal lip protruding into the inner chamber; when a rotation speed of the outer ring is smaller than a critical value, the seal lip of the elastic seal element is in contact with the contact ring and a radial clearance exists between the seal lip and the resist ring; and when the rotation speed of the outer ring is greater than or equal to the critical value, the seal lip departs from the contact ring and stands against the resist ring under a centrifugal force, so that the seal lip and the static seal ring form a first non-contact seal.

In some embodiments, the elastic seal element includes a root section fixedly configured on the connect ring, and a reduced thickness waist section connecting the root section and the seal lip; a thickness of the reduced thickness waist section is smaller than a thickness of the seal lip; and the seal lip is capable of rotating with respect to the reduced thickness waist section.

In some embodiments, the connect ring includes a first retention ring extending along the axial direction of the bearing and fixedly configured on an outer circumferential surface of the inner ring, and a transition ring connecting the first retention ring and the resist ring; the first retention ring and the resist ring are configured to be opposite to each other along the radial direction of the bearing; and the root section of the elastic seal element is fixedly configured on the first retention ring.

In some embodiments, the static seal ring further includes a second retention ring and a suspended ring; the second retention ring extends from a radial outer periphery of the contact ring along the axial direction of the bearing and is fixedly configured on an inner circumferential surface of the outer ring; the suspended ring extends from a radial inner periphery of the contact ring along the axial direction of the bearing; an extending direction of the suspended ring and that of the second retention ring are opposite; the first retention ring and the suspended ring are configured to be spaced from and opposite to each other along the radial direction of the bearing, and form second non-contact seal; and the resist ring and the second retention ring are configured to be spaced from and opposite to each other along the radial direction of the bearing, and form a third non-contact seal.

In some embodiments, the sealing structure further includes: a first labyrinth seal ring, which is located in a radial clearance between the first retention ring and the suspended ring, and is fixed on the suspended ring; and a second labyrinth ring, which is located in a radial clearance between the resist ring and the second retention ring, and is fixed on the resist ring.

In some embodiments, the resist ring has a tapered hole, and a diameter of the tapered hole gradually reduces along a direction from an axial inner end of the resist ring to an axial outer end of the resist ring.

In comparison with existing technologies, technical solutions provided by the present disclosure possess following advantages.

When the bearing rotates at a low speed, that is, when a rotation speed of the outer ring or the inner ring is smaller than a critical value, the seal lip is in contact with the contact ring and a radial clearance exists between the seal lip and the resist ring, so that the elastic seal element and the static seal ring form a contact seal. Therefore, the resulted bearing has a reliable sealing performance without producing a large friction torque. When the bearing rotates at a high speed, that is, when the rotation speed of the outer ring or the inner ring is greater than or equal to the critical value, the seal lip departs from the contact ring and stands against the resist ring under a centrifugal force, so that the elastic seal element and the static seal ring form a non-contact seal which is suitable for providing sealing for a bearing in high rotation speed. Accordingly, the sealing structure in the present disclosure can achieve advantages of both the contact seal and the non-contact seal.

DETAILED DESCRIPTION OF THE PREFERRED EMBODIMENTS

Interpretation of Technical Terms

An axial outer end and an axial inner end refer to: two ends of a ring-shaped component located on an axial end portion of a bearing along an axial direction of the bearing. The bearing includes an outer ring, an inner ring and rolling elements (not textually described in the following embodiments and not shown in the drawings) located between the inner ring and the outer ring. Wherein, the axial outer end refers to an end farther from the rolling elements along the axial direction of the bearing; and the axial inner end refers to an end nearer to the rolling elements along the axial direction of the bearing.

An axial outer side refers to a side farther from the rolling elements along the axial direction of the bearing; and an axial inner side refers to a side nearer to the rolling elements along the axial direction of the bearing.

In order to clarify the objects, characteristics and advantages of the present disclosure, embodiments of the present disclosure will be described in detail in conjunction with the accompanying drawings.

First Embodiment

Figure 1:
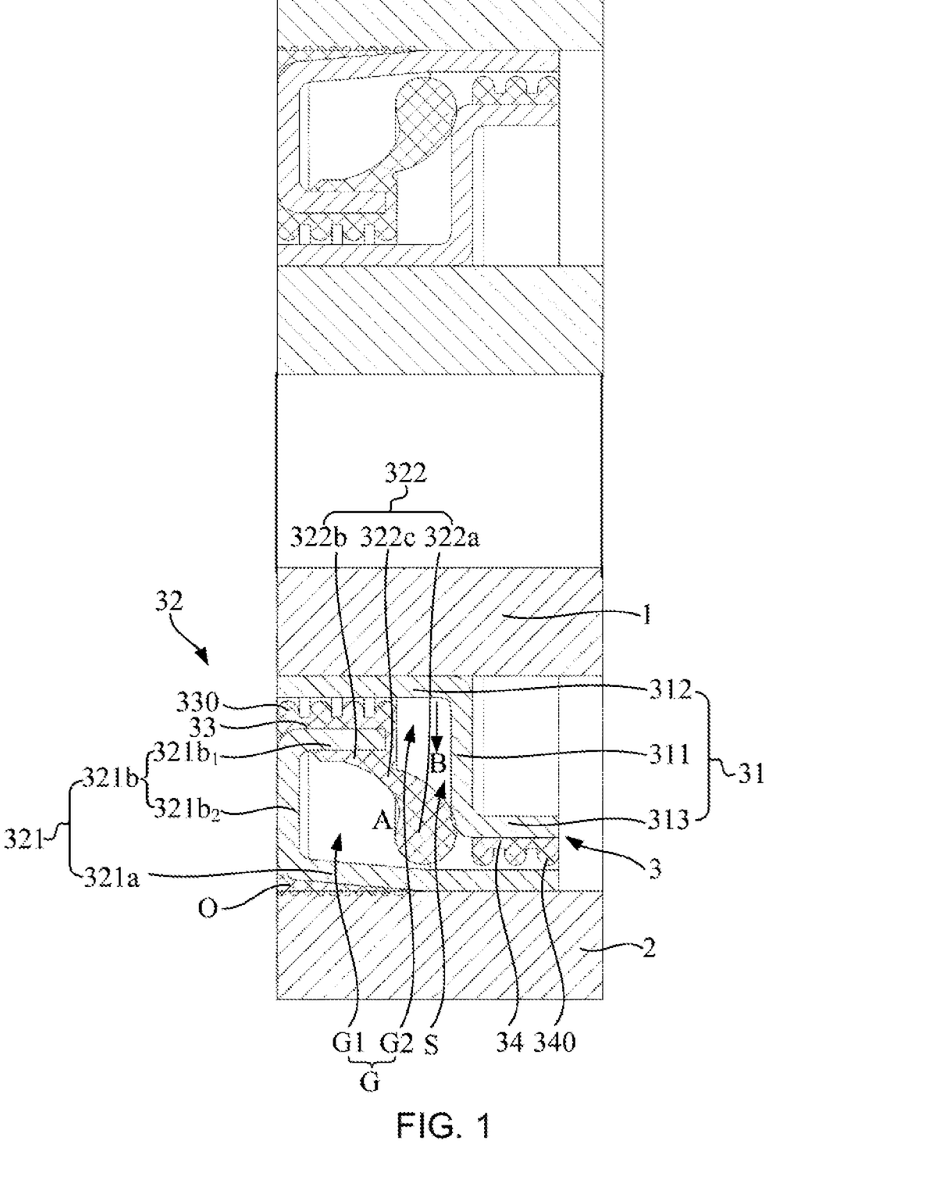
FIG. 1 schematically illustrates an axial cross section diagram of a part of an axial end portion of a bearing according to an embodiment of the present disclosure.

Referring to FIG. 1, a bearing with a rotary outer ring according to one embodiment is illustrated. The bearing includes: a non-rotary inner ring 1; a rotary outer ring 2; and a sealing structure 3 located in a radial clearance (not labeled) defined between the inner ring 1 and the outer ring 2, wherein the sealing structure 3 seals the bearing at an axial end portion of the bearing. The sealing structure 3 includes a static seal ring 31 and a dynamic seal ring 32 which are coaxial and with one encircling the other one.

The static seal ring 31 includes: a contact ring 311 extending along a radial direction of the bearing; a retention ring 312 extending from a radial inner periphery of the contact ring 311 along an axial direction of the bearing and fixedly configured on an outer circumferential surface of the inner ring 1; and a second suspended ring 313 extending from a radial outer periphery of the contact ring 311 along the axial direction of the bearing, wherein an extending direction of the second suspended ring 313 is opposite to an extending direction of the retention ring 312. In some embodiments, the contact ring 311, the retention ring 312 and the second suspended ring 313 may be formed into one piece and be made of metal (e.g., stainless steel).

The dynamic seal ring 32 includes: a ring-shaped body section 321 and an elastic seal element 322. In the present embodiment, the elastic seal element 322 is made of rubber. The body section 321 includes: a resist ring 321a extending along the axial direction of the bearing and fixedly configured on an inner circumferential surface of the outer ring 2; and a connect ring 321b connected with the resist ring 321a and located on a radial inner side of the resist ring 321a. The connect ring 321b is located on an axial inner side of the contact ring 311. The resist ring 321a, the connect ring 321b and the contact ring 311 form an inner chamber G.

Wherein, the connect ring 321b includes a first suspended ring 321b1 and a transition ring 321b2. The first suspended ring 321b1 extends along the axial direction of the bearing. The transition ring 321b2 connects the resist ring 321a and the first suspended ring 321b1, and extends along the radial direction of the bearing. The first suspended ring 321b1 and the resist ring 321a are configured to be spaced from and opposite to each other along the radial direction of the bearing. The elastic seal element 322 is located in the inner chamber G, and a root section 322b of the elastic seal element 322 is fixed on the first suspended ring 321b1. The elastic seal element 322 and the resist ring 321a are configured to be opposite to each other along the radial direction of the bearing. The elastic seal element 322 further includes a seal lip 322a protruding into the inner chamber G.

The first suspended ring 321b1 and the resist ring 321a are configured to be spaced from and opposite to each other along the radial direction of the bearing refers to that: the first suspended ring 321b1 and the resist ring 321a are arranged at intervals along the radial direction of the bearing, and have an area facing each other. In some embodiments, the resist ring 321a, the first suspended ring 321b1 and the transition ring 321b2 are formed into one piece and are made of metal (e.g., stainless steel). The elastic seal element 322 and the resist ring 321a are configured to be opposite to each other along the radial direction of the bearing refers to that: the elastic seal element 322 and the resist ring 321a have an area facing each other along the radial direction of the bearing.

When the outer ring 2 of the bearing rotates, the seal ring 32 is driven to rotate along with the outer ring 2. When the bearing rotates at a low speed, that is, a rotation speed of the outer ring 2 is smaller than a critical value, the seal lip 322a of the elastic seal element 322 is in contacts with the contact ring 311 and a radial clearance (not labeled) exists between the seal lip 322a and the resist ring 321a, so that the elastic seal element 322 and the static seal ring 31 form a contact seal that has a reliable sealing performance. In addition, as the elastic seal element 322 and the static seal ring 31 form the contact seal when the bearing rotates at the low speed, a large friction torque will not be produced.

When the bearing rotates at a high speed, that is, the rotation speed of the outer ring 2 is greater than or equal to the critical value, the seal lip 322 departs from the contact ring 311 and stands against the resist ring 321a under a centrifugal force, so that the seal lip 322a and the static seal ring 31 form a non-contact seal. The non-contact seal will not generate any friction torque, and is suitable for providing sealing for the bearing that rotates at the high speed.

The critical value of the rotation speed of the outer ring 2 can be selected by comprehensively taking an application situation, and demands of the bearing to the sealing performance and to the service life of the sealing structure into consideration. And a structure of the elastic seal element 322 is designed accordingly.

In the present embodiment, the bearing is a motor-driven hub bearing. Even a rotation speed of the motor-driven hub bearing reaches up to 40 m/s, the sealing structure still has a reliable sealing performance.

In technical solutions of the present disclosure, lubricating agent applied by the bearing is lubricating grease.

The first suspended ring 321b1 and the retention ring 312 are configured to be spaced from and opposite to each other along the radial direction of the bearing. The root section 322b of the elastic seal element 322 is configured with a first labyrinth seal ring 33 located in a radial clearance between the first suspended ring 321b1 and the retention ring 312. Therefore, with configuration of the first labyrinth seal ring 33, the first suspended ring 321b1 and the retention ring 312 form a labyrinth seal (one type of non-contact seal).

The resist ring 321a and the second suspended ring 313 are configured to be spaced from and opposite to each other along the radial direction of the bearing. The second suspended ring 313 is fixedly configured with a second labyrinth seal ring 34 located in a radial clearance between the resist ring 321a and the second suspended ring 313. Therefore, with configuration of the second labyrinth seal ring 34, the resist ring 321a and the second suspended ring 313 form a labyrinth seal. The first labyrinth seal ring 33 and the second labyrinth seal ring 34 are made of rubber.

The first suspended ring 321b1 and the contact ring 311 are spaced from each other along the axial direction of the bearing, and form a non-contact seal.

The non-contact seal formed by the resist ring 321a and the second suspended ring 313, the contact seal ring formed by the seal lip 322a and the static seal ring 31 when the bearing rotates at the low speed (or the non-contact seal ring formed when the bearing rotates at the high speed), the non-contact seal formed by the first suspended ring 321b1 and the contact ring 311, and the non-contact seal formed by the first suspended ring 321b1 and the retention ring 312 can successively serve as a first, a second, a third and a fourth defensive line for preventing external contaminants from entering into the bearing. The non-contact seal formed by the first suspended ring 321b1 and the retention ring 312, the non-contact seal formed by the first suspended ring 321b1 and the contact ring 311, the contact seal ring formed by the seal lip 322a and the static seal ring 31 when the bearing rotates at the low speed (or the non-contact seal ring formed when the bearing rotates at the high speed), and the non-contact seal formed by the resist ring 321a and the second suspended ring 313 can successively serve as a first, a second, a third and a fourth defensive line for preventing lubricating agent in the bearing from leaking out.

From above, it can be seen that, through adding the non-contact seal formed by the resist ring 321a and the second suspended ring 313, the non-contact seal formed by the first suspended ring 321b1 and the contact ring 311, and the non-contact seal formed by the first suspended ring 321b1 and the retention ring 321 into the sealing structure 3, a sealing performance of the sealing structure 3 is improved.

In an alternative embodiment, along the axial direction of the bearing, a clearance may exist between the first suspended ring 321b1 and the contact ring 311, but a non-contact seal is not formed. In this case, the sealing structure 3 is configured with three defensive lines for realizing sealing.

When the bearing rotates at the low speed, the elastic seal element 322 and the static seal ring 31 form a contact seal, and the inner chamber G is divided into two inner chamber units which do not communicate with each other, wherein the two inner chamber units are respectively a first inner chamber unit G1 and a second inner chamber unit G2. The first inner chamber unit G1 communicates with the radial clearance between the resist ring 321a and the second suspended ring 313, and the second inner chamber unit G2 communicates with the radial clearance between the first suspended ring 321ba and the retention ring 312. When the bearing rotates at the high speed, the second inner chamber unit G2 communicates with the radial clearance between the resist ring 321a and the second suspended ring 313, thus even there are external contaminations entering into the radial clearance between the resist ring 321a and the second suspended ring 313, it is hard for the external contaminations entering into the inner chamber unit G2 because of the centrifugal force, and it is harder for the external contaminations entering into the radial clearance between the first suspended ring 321b1 and the retention ring 312. Therefore, the external contaminations can be prevented from entering into the bearing, and the sealing performance of the sealing structure 3 is further improved.

The first labyrinth seal ring 33 has four ring-shaped seal teeth 330, and the second labyrinth seal ring 34 has three ring-shaped seal teeth 340. It should be noted that, number of the ring-shaped seal teeth 330 in the first labyrinth seal ring 33 and number of the ring-shaped seal teeth 340 in the second labyrinth seal ring 34 are not limited to the present embodiment and can be adjusted according to sealing requirements. The more the number of the ring-shaped seal teeth 330 and the number of the ring-shaped seal teeth 340, the better the sealing performance.

Both an axial cross-section of the ring-shaped seal teeth 330 and that of the ring-shaped seal teeth 340 are in a shape of semicircular cylinder. However, a shape of the ring-shaped seal teeth 330 and that of the ring-shaped seal teeth 340 are not limited to the present embodiment, and they may be configured into other shapes.

In an alternative embodiment, the first labyrinth seal ring 33 and the second labyrinth seal ring 34 may not be configured. In this case, through the radial clearance between the first suspended ring 321b1 and the retention ring 312, and the radial clearance between the resist ring 321a and the second suspended ring 313, the non-contact seal formed by the first suspended ring 321b1 and the retention ring 312, and the non-contact formed by the resist ring 321a and the second suspended ring 313 also can be realized, respectively.

In an alternative embodiment, the first labyrinth seal ring 33 may not be configured on the root section 322b of the elastic seal element 322, but be fixedly configured on the retention ring 312. The second labyrinth seal ring 34 may be fixedly configured on the resist ring 321a.

The elastic seal element 322 further includes a reduced thickness waist section 322c connecting the root section 322b and the seal lip 322a. The reduced thickness waist section 322c has a thickness smaller than a thickness of the seal lip 322a, so as to make a center of gravity of the elastic seal element 322 be located on the seal lip 322a. Through configuring the reduced thickness waist section 322c in the elastic seal element 322, the seal lip 322a can rotate with respect to the reduced thickness waist section 322c when the bearing rotates at the high speed, so as to make it easy for the seal lip 322a departing from the static seal ring 31. Further, when the bearing rotates at the high speed, the seal lip 322a itself will not deform due to the rotation. Further, when the bearing switches from the high-speed rotation into the low-speed rotation, it is easier for the seal lip 322a, which stands against the resist ring 321, recovering to the state of being in contact with the contact ring 311.

The reduced thickness waist section 322c has a thickness smaller than a thickness of the seal lip 322a refers to that: if sectioning the elastic seal element 322 using an axial surface, in a cross-section of the elastic seal element 322 obtained, a size of the reduced thickness waist section 322c along the axial direction of the bearing is smaller than a size of the seal lip 322a along the axial direction of the bearing, and an axis of the bearing is located on the axial surface.

In the present embodiment, an end of the resist ring 321a close to the connect ring 321b has a tapered hole (not labeled) whose diameter gradually increases along a direction from an axial inner end of the resist ring 321a to an axial outer end of the resist ring 321a, so as to make the end of the resist ring 321a close to the connect ring 321b have a shape of slope. When the seal lip 322a departs from the static seal ring 31, the slope is able to prevent the seal lip 322a from radially and inwardly bending. Therefore, the seal lip 322a is able to be prevented from being unable to recovering to the state of being in contact with the contact ring 311, when the bearing switches from the high-speed rotation to the low-speed rotation. In addition, even there are external contaminations (e.g., waste water) entering into the inner chamber G, the external contaminations will slide along the slope in effect of gravity itself, thus the external contaminations can easily leak out from the inner chamber G.

When the rotation speed of the outer ring 2 is smaller than the critical value, part of the elastic seal element 322 and part of the contact ring 311, which are located on a radial inner side of a contact position of the elastic seal element 322 and the contact ring 311, form an axial clearance S. In the present embodiment, a dimension of the axial clearance S between the elastic seal element 322 and the contact ring 311 gradually reduces along an outward radial direction B of the bearing. When the seal lip 322a departs from the static seal ring 31 under the centrifugal force, even there are external contaminations entering into the second inner chamber unit G2, the external contaminations in the second inner chamber unit G2 is prone to be thrown out from the axial clearance S in effect of the centrifugal force.

In the present embodiment, a seal ring O is configured between part of the resist ring 321a facing the resist ring 321a and the outer ring 2, so as to prevent lubricating agent in the bearing from leaking out between the resist ring 321 and the outer ring 2. In the present embodiment, the seal ring O is made of rubber.

Second Embodiment

Figure 2:
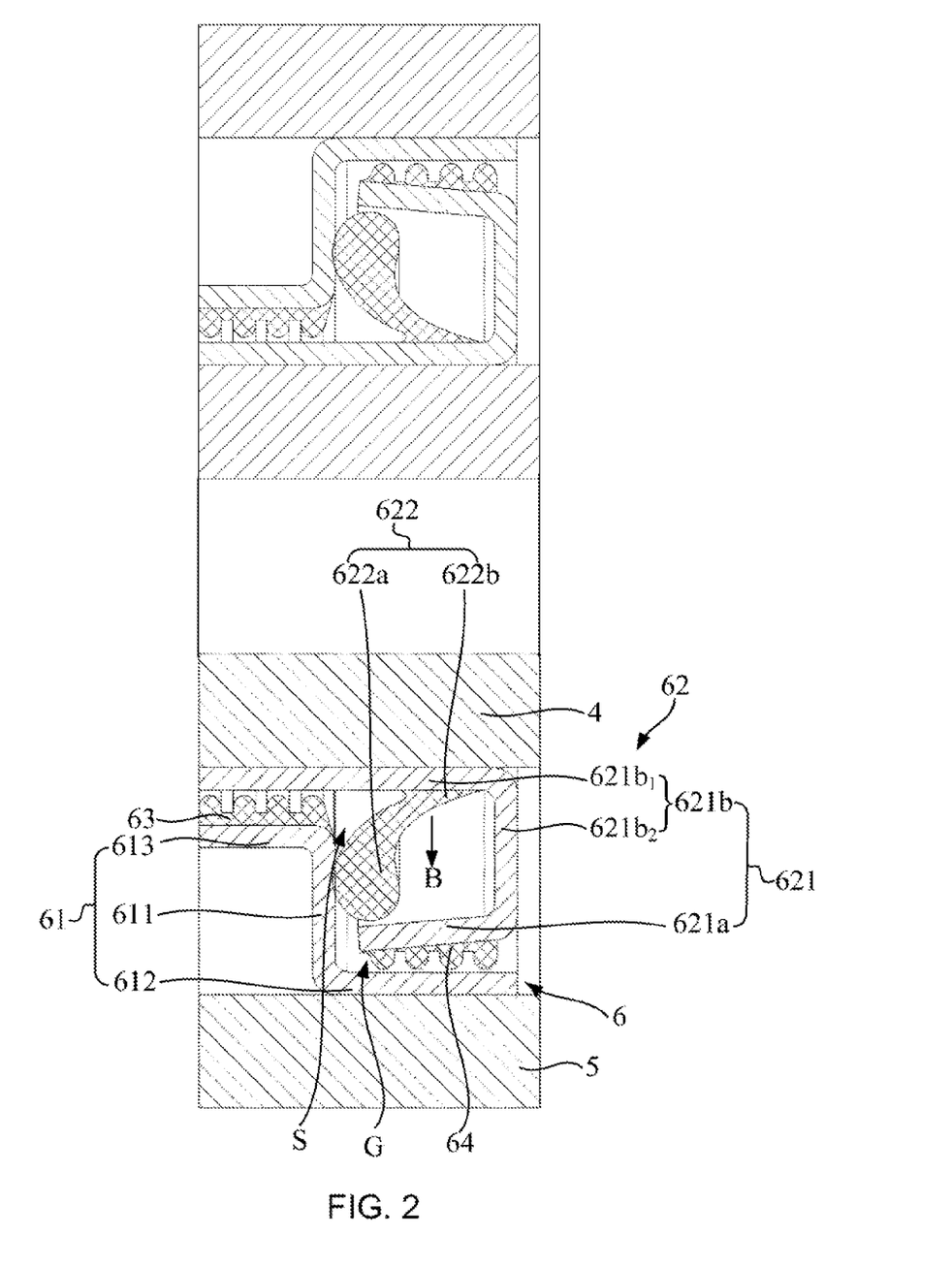
FIG. 2 schematically illustrates an axial cross section diagram of a part of an axial end portion of a bearing according to another embodiment of the present disclosure.

As shown in FIG. 2, a bearing with a rotary inner ring according to one embodiment is illustrated. The bearing includes: a rotary inner ring 4; a non-rotary outer ring 5; a sealing structure 6 located in a radial clearance between the inner ring 4 and the outer ring 5, wherein the sealing structure 6 seals the bearing at an axial end portion of the bearing. The sealing structure 6 includes a static seal ring 61 and a dynamic seal ring 62 which are coaxial and with one encircling the other one.

The static seal ring 61 includes: a contact ring 611 extending along a radial direction of the bearing; a second retention ring 612 extending from a radial outer periphery of the contact ring 611 along an axial direction of the bearing and fixedly configured on an inner circumferential surface of the outer ring 5; and a suspended ring 613 extending from a radial inner periphery of the contact ring 611 along the axial direction of the bearing, wherein an extending direction of the suspended ring 613 is opposite to an extending direction of the second retention ring 612.

The dynamic seal ring 62 includes: a ring-shaped body section 621 and an elastic seal element 622. The body section 621 includes: a connect ring 621a fixedly configured on an outer circumferential surface of the inner ring 4, and a resist ring 621b connected with the connect ring 621b and located on a radial outer side of the connect ring 621b. The resist ring 621a extends along the axial direction of the bearing and a radial clearance exists between the resist ring 621a and the inner ring 4. The resist ring 621a is located on an axial outer side of the contact ring 611. The connect ring 621b, the resist ring 621a and the contact ring 611 form an inner chamber G.

Wherein, the connect ring 621b includes a first retention ring 621b1 and a transition ring 621b2. The first retention ring 621b1 extends along the axial direction of the bearing and is fixedly configured on an outer circumferential of the inner ring 4. The transition ring 621b2 connects the first retention ring 621b1 and the resist ring 621a. The first retention ring 621b1 and the resist ring 621a are configured to be opposite to each other along the radial direction of the bearing. The elastic seal element 622 is located in the inner chamber G, and a root section 622b of the elastic seal element is fixedly configured on the first retention ring 621b1. The elastic seal element 622 and the resist ring 621a are configured to be opposite to each other along the radial direction of the bearing. The elastic seal element 622 includes a seal lip 622a protruding into the inner chamber G.

When the inner ring 4 of the bearing rotates, the seal ring 62 is driven to rotate along with the inner ring 4. When the bearing rotates at a low speed, that is, a rotation speed of the inner ring 4 is smaller than a critical value, the seal lip 622a of the elastic seal element 622 is in contact with the contact ring 611 and a radial clearance (not labeled) exists between the seal lip 622a and the resist ring 621a, so that the elastic seal element 622 and the static seal ring 61 form a contact seal which has a reliable sealing performance.

When the bearing rotates at a high speed, that is, the rotation speed of the inner ring 4 is greater than or equal to the critical value, the seal lip 622 departs from the contact ring 611 and stands against the resist ring 621a under a centrifugal force, so that the seal lip 622a and the static seal ring 61 form a non-contact seal. The non-contact seal will not produce any friction torque, and is suitable for providing sealing for the bearing that rotates at the high speed.

The first retention ring 621b1 and the suspended ring 613 are configured to be spaced from and opposite to each other along the radial direction of the bearing. A first labyrinth seal ring 63 is fixedly configured on the suspended ring 613, and the first labyrinth seal ring 63 is located in a radial clearance between the first retention ring 621b1 and the suspended ring 613. The resist ring 621a and the second retention ring 612 are configured to be spaced from and opposite to each other along the radial direction of the bearing. A second labyrinth seal ring 64 is fixedly configured on the resist ring 621a, and the second labyrinth seal ring 64 is located in a radial clearance between the resist ring 621a and the second retention ring 612. The resist ring 621a and the contact ring 611 are spaced from each other along the axial direction of the bearing, and form a non-contact seal.

Functions of non-contact seals formed by the first labyrinth seal ring 63, the second labyrinth seal ring 64 and the resist ring 621a with the contact ring 611 can refer to the first embodiment, which will not be described in detail.

Similar to the first embodiment, in an alternative embodiment of the second embodiment, the first labyrinth seal ring 63 and the second labyrinth seal ring 64 may not be configured, so that the first retention ring 621b1 and the suspended ring 613 directly form a non-contact seal, and the resist ring 621a and the second retention ring 612 form a non-contact seal.

Similar to the first embodiment, in an alternative embodiment of the second embodiment, the resist ring 621a and the contact ring 611 are spaced from each other along the axial direction of the bearing, but do not form a non-contact seal.

Structure of the elastic seal element 622 in the dynamic seal ring 62 can refer to the first embodiment, which will not be described in detail.

In the present embodiment, a dimension of the axial clearance S between the elastic seal element 622 and the contact ring 611 gradually reduces along an outward radial direction B of the bearing. Advantages brought by this configuration can refer to the first embodiment, which will not be described in detail.

In the present embodiment, the resist ring 621a has a tapered hole (not labeled) whose diameter gradually reduces along a direction from an axial inner end of the resist ring 621a to an axial outer end of the resist ring 621a, so as to make the resist ring 621a have a shape of slope. In the present embodiment, advantages of the shape of the resist ring 621a can refer to the first embodiment, which will not be described in detail.

It should be noted that, in the technical solutions of the present disclosure, a shape of the dynamic seal ring, a shape of the connect ring in the ring-shaped body section, a shape of the elastic seal element, and a position on the connect ring for fixedly configuring the elastic seal element thereon are not limited to the above recited embodiments.

In the present disclosure, each embodiment is described by a progressive way, and differences from previous embodiments are the emphasis. Identical portions of different embodiments can refer to each other.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A bearing, comprising a non-rotary inner ring, a rotary outer ring, and a sealing structure located in a radial clearance between the inner ring and the outer ring, wherein the sealing structure seals the bearing at an axial end portion of the bearing:
   the sealing structure comprises a static seal ring and a dynamic seal ring which are coaxial with one encircling the other;
   the static seal ring is fixedly configured on an outer circumferential surface of the inner ring, and comprises a contact ring extending along a radial direction of the bearing;
   the dynamic seal ring comprises a ring-shaped body section and an elastic seal element;
   the body section comprises a resist ring extending along an axial direction of the bearing and fixedly configured on an inner circumferential surface of the inner ring, and a connect ring connected with the resist ring and located on a radial inner side of the resist ring;
   the connect ring is located on an axial inner side of the contact ring;

the resist ring, the connect ring and the contact ring form an inner chamber;

the elastic seal element is fixedly configured on the connect ring and comprises a seal lip protruding into the inner chamber;

wherein when a rotation speed of the outer ring is smaller than a critical value, the seal lip of the elastic seal element is in contact with an axial end face of the contact ring and a radial clearance exists between the seal lip and the resist ring; and wherein when the rotation speed of the outer ring is greater than or equal to the critical value, the seal lip departs from the contact ring and stands against the resist ring under a centrifugal force, so that the seal lip and the static seal ring form a first non-contact seal.

2. The bearing according to claim 1, wherein the elastic seal element comprises a root section fixedly configured on the connect ring, and a reduced thickness waist section connecting the root section and the seal lip; a thickness of the reduced thickness waist section is smaller than a thickness of the seal lip; and the seal lip is rotatable with respect to the reduced thickness waist section.

3. The bearing according to claim 2, wherein the connect ring comprises a first suspended ring extending along the axial direction of the bearing, and a transition ring extending along the radial direction of the bearing and connecting the resist ring and the first suspended ring; the first suspended ring and the resist ring are configured to be spaced from and opposite to each other along the radial direction of the bearing; and the root section is fixed on the first suspended ring.

4. The bearing according to claim 3, wherein the static seal ring further comprises a retention ring and a second suspended ring;

the retention ring extends from a radial inner periphery of the contact ring along the axial direction of the bearing and is fixedly configured on an outer circumferential surface of the inner ring;

the second suspended ring extends from a radial outer periphery of the contact ring along the axial direction of the bearing;

an extending direction of the second suspended ring and that of the retention ring are opposite;

the first suspended ring and the retention ring are configured to be spaced from and opposite to each other along the radial direction of the bearing, and form a second non-contact seal; and the resist ring and the second suspended ring are configured to be spaced from and opposite to each other along the radial direction of the bearing, and form a third non-contact seal.

5. The bearing according to claim 4, wherein the root section of the elastic seal element is configured with a first labyrinth seal ring, and the first labyrinth seal ring is located in a radial clearance between the first suspended ring and the retention ring; and the sealing structure is configured with a second labyrinth seal ring, the second labyrinth seal ring is located in a radial clearance between the resist ring and the second suspended ring, and the second labyrinth seal ring is fixed on the second suspended ring.

6. The bearing according to claim 1, wherein an end of the resist ring close to the connect ring has a tapered hole, and a diameter of the tapered hole gradually increases along a direction from an axial inner end of the resist ring to an axial outer end of the resist ring.

7. A bearing, comprising a rotary inner ring, a non-rotary outer ring, and a sealing structure located in a radial clearance between the inner ring and the outer ring, wherein the sealing structure seals the bearing at an axial end portion of the bearing:

the sealing structure comprises a static seal ring and a dynamic seal ring which are coaxial with one encircling the other one;

the static seal ring is fixedly configured on an inner circumferential surface of the outer ring, and comprises a contact ring extending along a radial direction of the bearing;

the dynamic seal ring comprises a ring-shaped body section and an elastic seal element;

the body section comprises a connect ring and a resist ring, the connect ring is fixedly configured on an outer circumferential surface of the inner ring, and the resist ring is connected with the connect ring and is located on a radial outer side of the connect ring;

the resist ring extends along an axial direction of the bearing and a radial clearance exists between the resist ring and the inner ring;

the resist ring is located on an axial outer side of the contact ring;

the connect ring, the resist ring and the contact ring form an inner chamber;

the elastic seal element is fixedly configured on the connect ring and comprises a seal lip protruding into the inner chamber;

wherein when a rotation speed of the outer ring is smaller than a critical value, the seal lip of the elastic seal element is in contact with an axial end face of the contact ring and a radial clearance exists between the seal lip and the resist ring; and wherein when the rotation speed of the outer ring is greater than or equal to the critical value, the seal lip departs from the contact ring and stands against the resist ring under a centrifugal force, so that the seal lip and the static seal ring form a first non-contact seal.

8. The bearing according to claim 7, wherein the elastic seal element comprises a root section fixedly configured on the connect ring, and a reduced thickness waist section connecting the root section and the seal lip; a thickness of the reduced thickness waist section is smaller than a thickness of the seal lip; and the seal lip is rotatable with respect to the reduced thickness waist section.

9. The bearing according to claim 8, wherein the connect ring comprises a first retention ring extending along the axial direction of the bearing and fixedly configured on an outer circumferential surface of the inner ring, and a transition ring connecting the first retention ring and the resist ring; the first retention ring and the resist ring are configured to be opposite to each other along the radial direction of the bearing; and the root section of the elastic seal element is fixedly configured on the first retention ring.

10. The bearing according to claim 9, wherein the static seal ring further comprises a second retention ring and a suspended ring;

the second retention ring extends from a radial outer periphery of the contact ring along the axial direction of the bearing and is fixedly configured on an inner circumferential surface of the outer ring;

the suspended ring extends from a radial inner periphery of the contact ring along the axial direction of the bearing;

an extending direction of the suspended ring and that of the second retention ring are opposite;

the first retention ring and the suspended ring are configured to be spaced from and opposite to each other along the radial direction of the bearing, and form second non-contact seal; and the resist ring and the second retention ring are configured to be spaced from and opposite to each other along the radial direction of the bearing, and form a third non-contact seal.

11. The bearing according to claim 10, wherein the sealing structure further comprises:
  a first labyrinth seal ring, which is located in a radial clearance between the first retention ring and the suspended ring, and is fixed on the suspended ring; and
  a second labyrinth ring, which is located in a radial clearance between the resist ring and the second retention ring, and is fixed on the resist ring.

12. The bearing according to claim 7, wherein the resist ring has a tapered hole, and a diameter of the tapered hole gradually reduces along a direction from an axial inner end of the resist ring to an axial outer end of the resist ring.

13. A bearing, comprising a non-rotary inner ring, a rotary outer ring, and a sealing structure located in a radial clearance between the inner ring and the outer ring, wherein the sealing structure seals the bearing at an axial end portion of the bearing:
  the sealing structure comprises a static seal ring and a dynamic seal ring which are coaxial with one encircling the other;
  the static seal ring is fixedly configured on an outer circumferential surface of the inner ring, and comprises a contact ring extending along a radial direction of the bearing;
  the dynamic seal ring comprises a ring-shaped body section and an elastic seal element;
  the body section comprises a resist ring extending along an axial direction of the bearing and fixedly configured on an inner circumferential surface of the inner ring, and a connect ring connected with the resist ring and located on a radial inner side of the resist ring;
  the connect ring is located on an axial inner side of the contact ring;
  the resist ring, the connect ring and the contact ring form an inner chamber;
  the elastic seal element is fixedly configured on the connect ring and comprises a seal lip protruding into the inner chamber;
  wherein when a rotation speed of the outer ring is smaller than a critical value, the seal lip of the elastic seal element is in contact with the contact ring and a radial clearance exists between the seal lip and the resist ring;
  wherein when the rotation speed of the outer ring is greater than or equal to the critical value, the seal lip departs from the contact ring and stands against the resist ring under a centrifugal force, so that the seal lip and the static seal ring form a first non-contact seal, and
  the elastic seal element comprises a root section fixedly configured on the connect ring, and a reduced thickness waist section connecting the root section and the seal lip; a thickness of the reduced thickness waist section is smaller than a thickness of the seal lip; and the seal lip is rotatable with respect to the reduced thickness waist section.

14. The bearing according to claim 13, wherein the connect ring comprises a first suspended ring extending along the axial direction of the bearing, and a transition ring extending along the radial direction of the bearing and connecting the resist ring and the first suspended ring; the first suspended ring and the resist ring are configured to be spaced from and opposite to each other along the radial direction of the bearing; and the root section is fixed on the first suspended ring.

15. The bearing according to claim 14, wherein the static seal ring further comprises a retention ring and a second suspended ring;
  the retention ring extends from a radial inner periphery of the contact ring along the axial direction of the bearing and is fixedly configured on an outer circumferential surface of the inner ring;
  the second suspended ring extends from a radial outer periphery of the contact ring along the axial direction of the bearing;
  an extending direction of the second suspended ring and that of the retention ring are opposite;
  the first suspended ring and the retention ring are configured to be spaced from and opposite to each other along the radial direction of the bearing, and form a second non-contact seal; and
  the resist ring and the second suspended ring are configured to be spaced from and opposite to each other along the radial direction of the bearing, and form a third non-contact seal.

16. The bearing according to claim 15, wherein the root section of the elastic seal element is configured with a first labyrinth seal ring, and the first labyrinth seal ring is located in a radial clearance between the first suspended ring and the retention ring; and
  the sealing structure is configured with a second labyrinth seal ring, the second labyrinth seal ring is located in a radial clearance between the resist ring and the second suspended ring, and the second labyrinth seal ring is fixed on the second suspended ring.

17. The bearing according to claim 13, wherein an end of the resist ring close to the connect ring has a tapered hole, and a diameter of the tapered hole gradually increases along a direction from an axial inner end of the resist ring to an axial outer end of the resist ring.

* * * * *